(12) United States Patent
Valverde Garro et al.

(10) Patent No.: US 10,560,317 B2
(45) Date of Patent: Feb. 11, 2020

(54) SUBSCRIPTION TO A SUBSET OF SWITCHING EVENTS

(71) Applicant: Hewlett Packard Enterprise Development LP, Houston, TX (US)

(72) Inventors: Diego Valverde Garro, San Jose (CR); Claudio Enrique Viquez Calderon, Heredia (CR); Jose Daniel Hernandez Vargas, Heredia (CR); Osvaldo Andres Sanchez Melendez, Heredia (CR)

(73) Assignee: Hewlett Packard Enterprise Development, Houston, TX (US)

( * ) Notice: Subject to any disclaimer, the term of this patent is extended or adjusted under 35 U.S.C. 154(b) by 0 days.

(21) Appl. No.: 16/061,132

(22) PCT Filed: Dec. 11, 2015

(86) PCT No.: PCT/US2015/065233
§ 371 (c)(1),
(2) Date: Jun. 11, 2018

(87) PCT Pub. No.: WO2017/099793
PCT Pub. Date: Jun. 15, 2017

(65) Prior Publication Data
US 2018/0359141 A1    Dec. 13, 2018

(51) Int. Cl.
*H04L 12/24* (2006.01)
*H04L 12/931* (2013.01)

(52) U.S. Cl.
CPC ......... *H04L 41/0686* (2013.01); *H04L 49/65* (2013.01)

(58) Field of Classification Search
CPC ..... H04L 41/0686; H04L 49/65; H04L 43/00; H04L 43/50
See application file for complete search history.

(56) References Cited

U.S. PATENT DOCUMENTS

| 3,905,025 | A | | 9/1975 | Davis et al. |
| 4,385,206 | A | * | 5/1983 | Bradshaw .......... H04Q 11/0407 370/384 |
| 5,530,875 | A | | 6/1996 | Wach |
| 5,938,736 | A | * | 8/1999 | Muller .................... H04L 29/06 370/392 |

(Continued)

FOREIGN PATENT DOCUMENTS

| KR | 10-2011-0014539 A | 2/2011 |
| KR | 10-2013-0044002 A | 5/2013 |
| WO | WO-2013/049326 A2 | 4/2013 |

OTHER PUBLICATIONS

International Searching Authority, The International Search Report and the Written Opinion, dated Aug. 18, 2016, PCT/US2015/065233, 12 Pgs.

(Continued)

*Primary Examiner* — Sharad Rampuria
(74) *Attorney, Agent, or Firm* — Hewlett Packard Enterprise Patent Department

(57) ABSTRACT

Examples herein disclose a processor to receive a list of switching events. The list of switching events is internal to a networking device and capable of detection by a programmable engine. The processor subscribes to a subset of the switching events based on a selection from the list of switching events.

15 Claims, 6 Drawing Sheets

(56) References Cited

U.S. PATENT DOCUMENTS

| | | | |
|---|---|---|---|
| 6,754,206 B1* | 6/2004 | Nattkemper | H04L 49/103 |
| | | | 370/369 |
| 6,782,428 B1 | 8/2004 | Gleeson et al. | |
| 7,287,112 B1* | 10/2007 | Pleis | G06F 15/7867 |
| | | | 710/266 |
| 7,310,333 B1* | 12/2007 | Conklin | H04Q 3/68 |
| | | | 370/388 |
| 2007/0083622 A1* | 4/2007 | Wang | H04L 49/351 |
| | | | 709/223 |
| 2009/0303883 A1 | 12/2009 | Kucharczyk et al. | |

OTHER PUBLICATIONS

Kevin Jeffay and Donald L. Stone, "Accounting for Interrupt Handling Costs in Dynamic Priority Task Systems," Proceedings of the 14th IEEE Real-Time Systems Symposium, Raleigh-Durham, NC, USA, Dec. 1993, pp. 212-221 (pp. 1-10), IEEE.

* cited by examiner

US 10,560,317 B2

SUBSCRIPTION TO A SUBSET OF SWITCHING EVENTS

BACKGROUND

In a networking switch, a programmable engine such as an application-specific integrated circuit (ASIC), may experience various events internal to the networking switch. Such various events may include counter overflows, meter thresholds, interrupts, security events, register values among others.

BRIEF DESCRIPTION OF THE DRAWINGS

In the accompanying drawings, like numerals refer to like components or blocks. The following detailed description references the drawings, wherein.

DETAILED DESCRIPTION

In a networking switch, a switch ASIC may communicate over a channel with a processor. The channel involves a polling or interrupt based model in which data is transmitted to the processor in response to various switching events. Switching events as described herein, is an unexpected condition in hardware and/or software internal to the networking switch and capable of detection by the ASIC. Transmitting data in response to all of the various switching events may often cause a bottleneck since the processor may be unable to process a large amount of data from the various switching events. Additionally, polling for all of the various switching events can consume several processor clock cycles. Further, the processor may be unable to efficiently discriminate among the switching events thus producing much congestion.

To address these issues, examples disclose a subscription to a subset of switching events. The examples provide a networking switching including a processor and a programmable engine (e.g., ASIC). The processor receives a list of switching events internal to the networking switch and capable of detection by the programmable engine. The processor proceeds to create the subscription to the subset of switching events based on a selection of the switching events from the list. Creating the subscription to the subset of switching events eliminates data congestion by reducing the number of switching events in which the processor receives information. Reducing the number of switching events, reduces the number of clock cycles as the overall event data transmitted to the processor is reduced.

In another example, the processor prioritizes the switching events from the list to create the subscription. Prioritizing the switching events, allows the processor to differentiate among those switching events which may have a higher importance, such as security events. This allows the processor to customize a subscription model.

Figure 1:
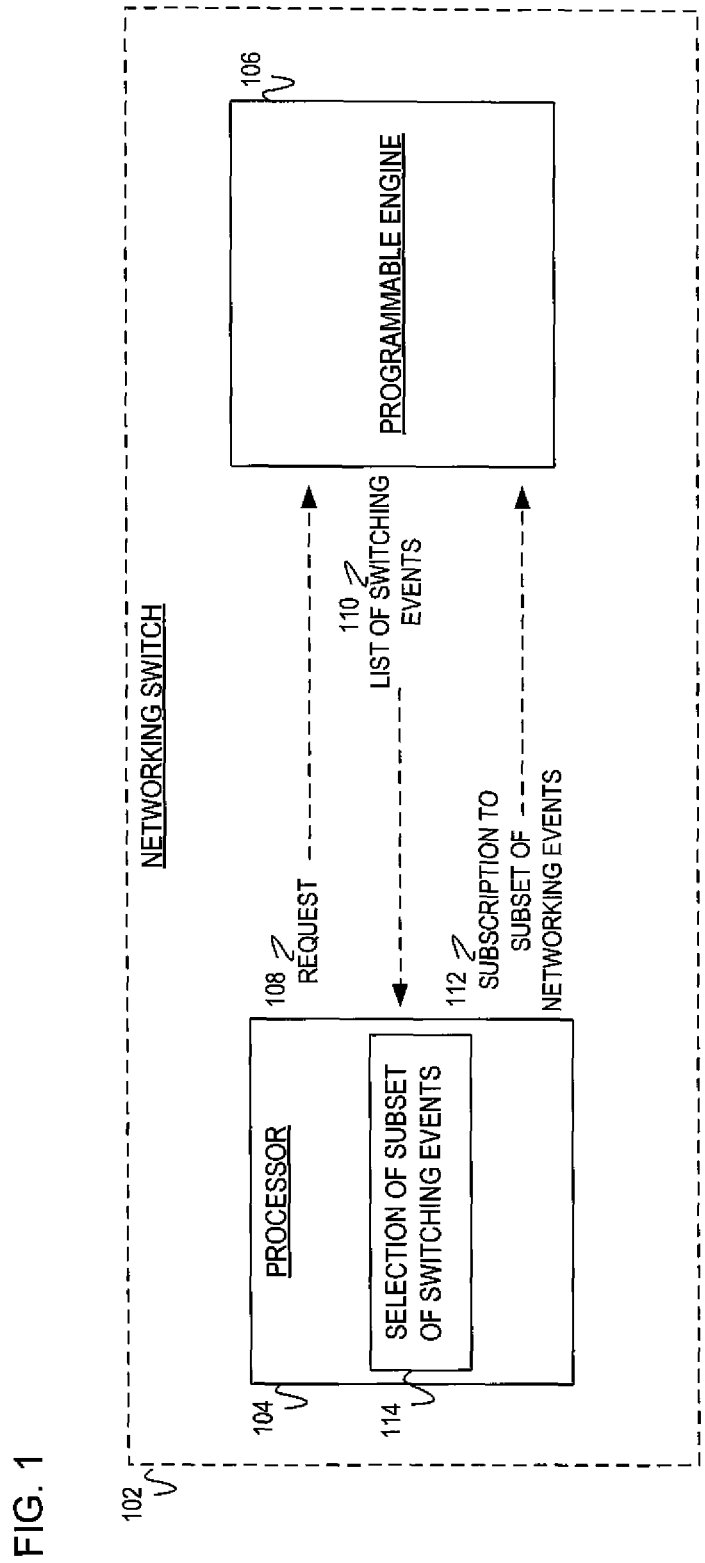
FIG. 1 is a block diagram of an example networking switch including a programmable engine to produce a list of switching events and a processor to select a subset of switching events from the list to create a subscription.

FIG. 1 is a block diagram of an example networking switch 102 including a processor 106 and a programmable engine 106. The processor 108 initiates a request 108 to the programmable engine 106, serving as a petition for a list of switching events 110. In response to the request 108, the programmable engine 106 transmits the list of switching events 110. The list of switching events 110 are those events that occur internal to the networking switch 102 and are capable of detection by the programmable engine 106. Based on receiving the list of switching events 110, the processor in turn selects a subset of the switching events at module 114. The subset of the switching events selected by the processor 104 at module 114, creates a subscription to the subset of networking events 112 which is transmitted to the programmable engine 106. FIG. 1 represents a networking system to receive and transmit networking traffic. As such, implementations of the system include a software defined network (SDN), domain name system (DNS) network, legacy domain network, wide area network, legacy network, local area network (LAN), Ethernet, optic cable network, or other type of networking system capable of handling networking traffic. Although FIG. 1 illustrates the system as including the networking switch 102, implementations should not be limited as the system may include additional components not illustrated such as client devices, other networking devices, etc.

The networking switch 102 is a networking device as part of a networking system that provides connections between other networking components (not illustrated) using packet switching to receive, process, and forward packets to a destination device. Implementations of the networking switch 102 include, by way of example, a networking component, switch, router, virtual networking component, or other type of networking device which routes networking traffic to the appropriate destinations.

The processor 104 initiates communication with the programmable engine 106 via transmission of the request 108. In response, the processor 104 receives the list of switching events 110 from the programmable engine 106. In turn, the processor 104 selects those switching events from the list 110 to create the subscription to the subset of the switching events 112. The processor 104 is a hardware component internal to the networking switch 102 that is responsible for management and functionality of the switch 102. As such implementation of the processor 104 include, by way of example, a central processing unit (CPU), integrated circuit, semiconductor, processing resource, or other type of hardware component capable of the functionality of the processor 104.

The programmable engine 106 is hardware component which is customized for a particular functionality. The functionality may include tracking those switching events which the programmable engine 106 is capable of detecting and creating the list 110 of such switching events. Upon receiving the subscription to the subset of switching events 112, the programmable engine 106 monitors those limited switching events as in the subscription 112. Monitoring the limited number of switching events, the programmable engine 106 collects event data upon the occurrence of one of the switching events from the subset. In this implementation, the programmable engine 106 includes a storage component (not illustrated) which maintains the event data upon the occurrence(s) of the switching events. In another implementation, the processing engine 106 may include, electronic circuitry (i.e., hardware) that implements the functionality of the processing engine 108, such an integrated circuit, application integrated circuit (ASIC), controller, processor, semiconductor, processing resource, chipset, or other type of hardware component capable of the functionality of the processing engine 106. Alternatively, the processing engine 106 may include instructions (e.g., stored on a machine-readable medium) that, when executed by a hardware component (e.g., networking switch 102), implements the functionality of the processing engine 106.

The list of switching events 110 includes a full set of switching events internal to the networking switch 102 which the programmable engine 106 has the capabilities to detect an occurrence. The list of switching events 110 specifies those events in which the programmable engine 106 has the capability to determine an occurrence of that event. The programmable engine 106 may access various components internal to the switching device to monitor whether there was the occurrence of one of the switching events. For example, the programmable engine 106 may access a counter, meter, register, or code running on a hardware component. As such, the programmable engine 106 can identify whether these components and/or code has encountered an unexpected condition that may affect the operation of the networking switch 102. These unexpected conditions of the hardware devices and/or code are referred to as the switching events. The switching events include, by way of example, bit changes, changes in a register, packet violations, overflows, etc. Further examples may include changes in a disparity bit, packet size violation, packet source violations, violations of the transmission of a number of packets over a time period, counter overflows, meter thresholds, interrupts, security events, register error, counter error, etc. The list of switching events 110 is a series of names corresponding to these switching events. The processor 104 receives the list 110 and identifies the subset of switching events at module 114 in which to subscribe to notices of the occurrences.

The subscription to the subset of switching events 112 are those events identified at module 114 the processor 104 may select to receive notices of the occurrences or happenings. The subscription 112 indicates to the programmable engine 106 which events to monitor. Upon the occurrence or happening of one of the switching events from the subset, the programmable engine 106 transmits a signal to the processor 104 indicating the occurrence. The signal notifies the processor 104 of the occurrence to one of the switching events in the subscription 112. In another implementation, the programmable engine 106 transmits the event data to the processor 104 upon the occurrence. The event data may include details on the type of event, the length of the event, etc.

At module 114, the processor 104 selects the subset of switching events from the list 110. In one implementation, the processor 104 selects the subset of switching events by prioritizing each of the switching events. In this implementation, each of the switching events from the list 110 is evaluated as importance to the processor 104. Thus, the switching events in higher priority are selected as the subset while the switching events in lower priority may be ignored. In another implementation, each of the switching events in the list 110 are given a weighting mechanism. This allows the selection of the switching events by identifying those events which are given a larger weighting mechanism. In a further implementation, upon receipt the list 110 by the processor 104, each of the switching events from the list 110 are categorized or classified according to the function of the event. For example, some switching events function as security violations, other switching events function for switch accounting purposes, yet while other switching events may serve as a checkpoint of the operation of the components internal to the networking switch 102. Each of the switching events from the list 110 are classified into the one or more categories (e.g., security, accounting, etc.). The processor 104 may select the category of switching events in which to subscribe to. The module 114 may include, by way of example, instructions (e.g., stored on a machine-readable medium) that, when executed (e.g., by the processor 104), implement the functionality of module 114. Alternatively, or in addition, the module 114 may include electronic circuitry (i.e., hardware) that implements the functionality of module 114.

Figure 2A:
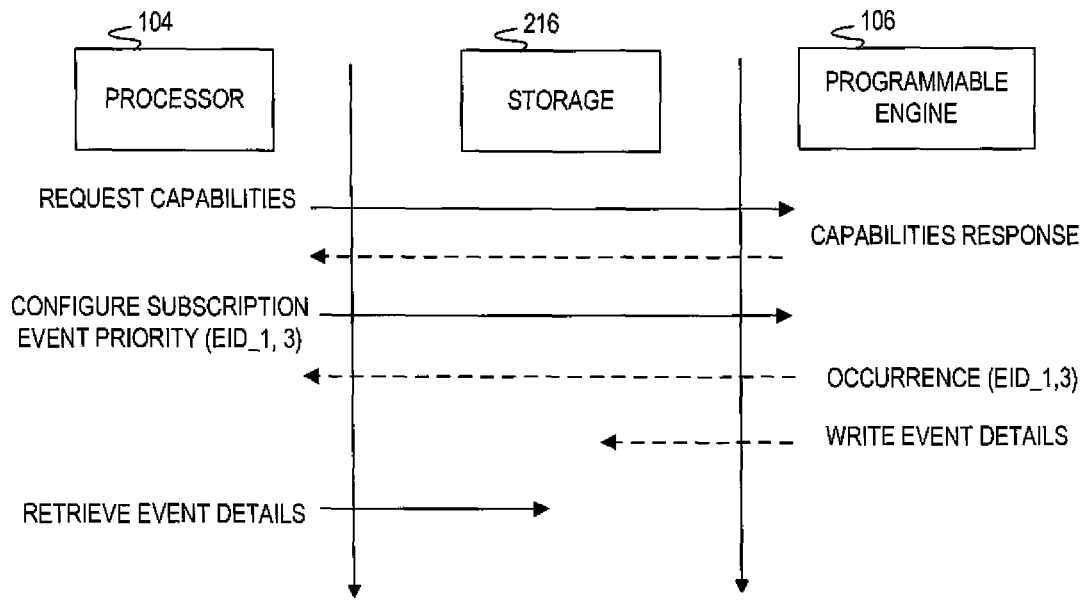
FIGS. 2A-2B illustrate example communications in a networking switch between a processor and a programmable engine to subscribe to a subset of switching events internal to the networking switch.
Figure 2B:
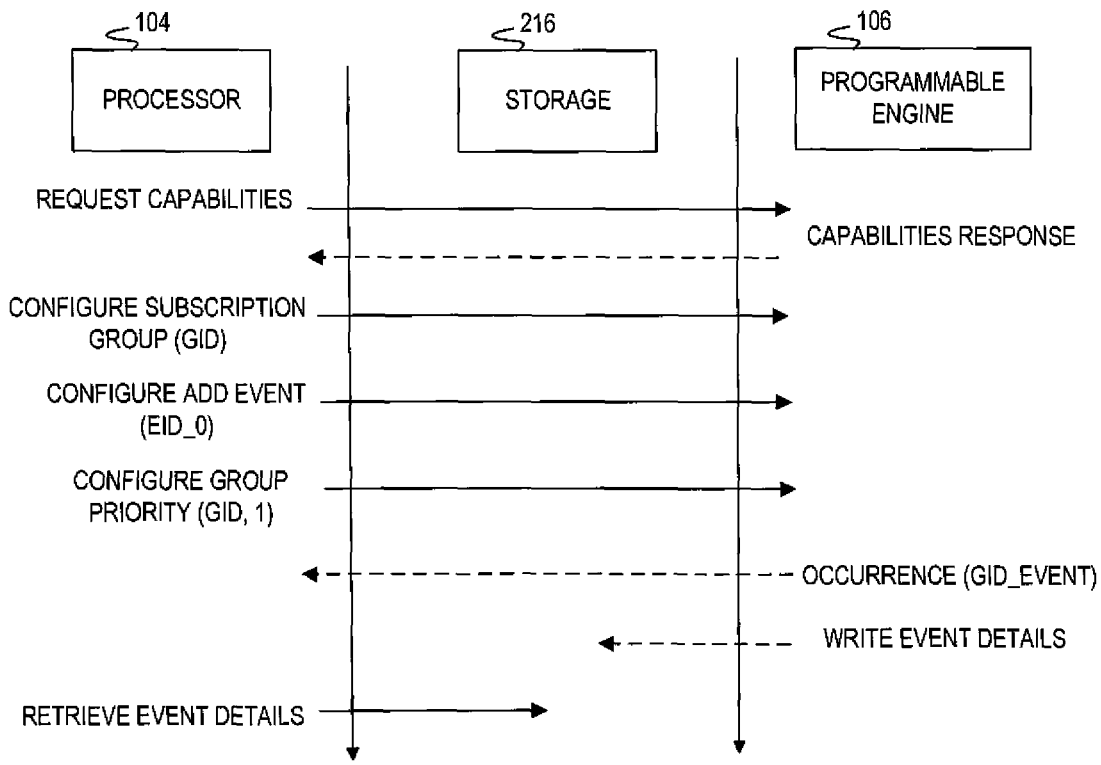

FIGS. 2A-2B illustrate example communications between a processor 104, programmable engine 106, and storage 216 in a networking switch. The example communications create a subscription to a subset of switching events from a list. The subscription includes prioritizing switching events and/or groups. Upon an occurrence from one of the switching events in the subscription, the programmable engine 106 writes event details to the storage 216. In one implementation, the details to the switching event are written in a first-in-first-out (FIFO) manner. The FIFO manner means the earliest switching event details are written first. This allows the processor 104 to retrieve the earlier event switching details prior to the retrieving details over later switching events. The storage 216, is located adjacent to the programmable engine 106 to maintain the event details. The processor 104 accesses the storage 216 to retrieve the event details.

FIG. 2A illustrates the example communications for a switching event subscription. The processor 104 transmits the request for the capabilities of the switching events to the programmable engine 106. The programmable engine 106 in turn responds with the list of switching events capable of detection by the programmable engine 106. Upon the processor 104 receiving the list of switching events capable of detection by the programmable engine 106, the processor 104 selects those events in which to create a subscription. For example, the processor 104 configures a subscription to switching event identifications 1 and 3 (EID_1,3). In this example, both event identifications are given priority over other switching event identifications. Additionally in this example, event identifications 1 and 3 are the subset of switching events in which the processor 104 subscribes to receive notifications of an occurrence. Upon the occurrence of one of these switching events (1 or 3), the programmable engine 106 writes the event details to the storage 216 and transmits a signal to the processor 104. The signal serves as the notification to the processor 104 as the occurrence of one of the switching events in the subscription. The processor 104 receives the signal and proceeds to retrieve the event details from the storage 216.

FIG. 2B illustrates a subscription to a group of switching events, adding a switching event to the group, and adding a priority of the group. As explained in connection with FIG. 2A, the processor 104 transmits the request and receives a list of switching events in which the programmable engine 106 is capable of detecting. The processor 104 proceeds to categorize each of the switching events from the list to create multiple groups of switching events. For example, the groups may include traffic violations (e.g., size violation, source of traffic violation) and errors (e.g., register value errors, counter overflows). The switching events from the list are classified into these groups. The processor 104 proceeds to transmit which group (GID) to subscribe to notification from the programmable engine 106. The processor 104 may also dynamically change the subscription by subscribing and unsubscribing to events. For example, the processor 104 adds event (EID_0) to the group through the configuration to the subscription. Additionally, if the subscription includes multiple groups of switching events, the processor 104 prioritize which groups (GID, 1) should be rated higher than other groups.

Figure 3:
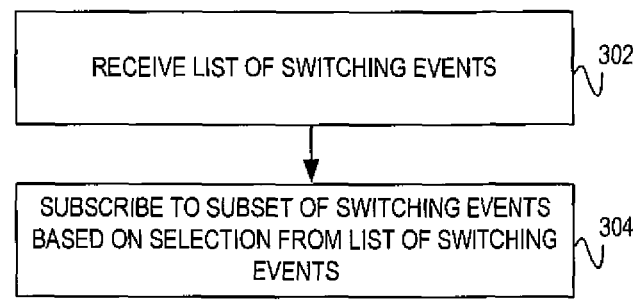
FIG. 3 is a flowchart of an example method executable by a networking device to receive a list of switching events from a programmable engine and subscribe to a subset of switching events based on a selection from the list of switching events.

FIG. 3 is a flowchart of an example method executable by a processor to subscribe to a subset of switching events. The processor transmits a request to a programmable engine and in turn receives a list of switching events capable of detection by the programmable engine. Upon receiving the list of switching events, the processor selects the subset of switching events from the list. Selecting the subset of switching events, the processor transmits the subscription to the subset of selected switching events. In discussing FIG. 3, references may be made to the components in FIGS. 1-2B to provide contextual examples. For example, the processor 104 and the programmable engine 106 as in FIG. 1 may communicate for transmission of a request and to receive the list of switching events. As the processor and the programmable engine are internal components to the networking device, in this implementation, the networking device executes operations 302-304 to subscribe to the subset of switching events. Although FIG. 3 is described as implemented by the processor and/or networking device, it may be executable on other suitable components. For example, FIG. 3 may be implemented in the form of executable instructions on a machine-readable storage medium 504 and 604 as in FIGS. 5-6.

At operation 302, the processor receives the list of switching events from the programmable engine. Initially, the processor transmits the request to the programmable engine for the list of switching events the programmable engine is capable of detecting. In this implementation, the programmable engine may access various components to identify the capability of the programmable engine. For example, the programmable engine may access a counter, meter, register, or code running on a hardware component. As such, the programmable engine may identify whether these components and/or code has an unexpected condition which would be identified as an error. These unexpected conditions of the hardware devices and/or code are considered the switching events. The switching events include, by way of example, changes bits, changes in a register, packet size violations, overflows, etc. Further examples may include changes in a disparity bit, packet size violation, packet source violations, violations of the transmission of a number of packets over a time period, counter overflows, register error, counter error, etc.

At operation 304, the processor subscribes to the subset of switching events. The subset of switching events are identified from a selection of the switching events from the list. At any given time, the processor may utilize the list of switching events to dynamically subscribe or unsubscribe to particular switching events. In one implementation, the processor assigns a priority or weighting value to each of the switching events in the list to identify which switching events are relevant and to discard those switching events the processor may no longer desire notifications. In a further implementation, the processor can create and subscribe to collections or groups of switching events from the list. For example, the processor may categorize each of the switching events from the list. Thus, the processor may select at least one of the categories of switching events in which to subscribe. For example, the processor may select one type of switching events to subscribe to such as security violations or overflow errors. Thus, those switching events in the list relevant to the security violations are selected as the subset from the list. This subset selection is transmitted to the programmable engine for the programmable engine to monitor the selected switching events in which the processor has subscribed. This allows the processor to reduce the event information from the programmable engine by prioritizing those switching events in which to receive information. In a further implementation, upon an occurrence of one of the switching events in the subset, the programmable engine writes the switching event information in a first-in-first-out manner to storage. In this implementation, upon the occurrence, the programmable engine transmits an interrupt signal to the processor. This interrupt signal serves as a notification for the processor to retrieve the event information from the storage.

Figure 4:
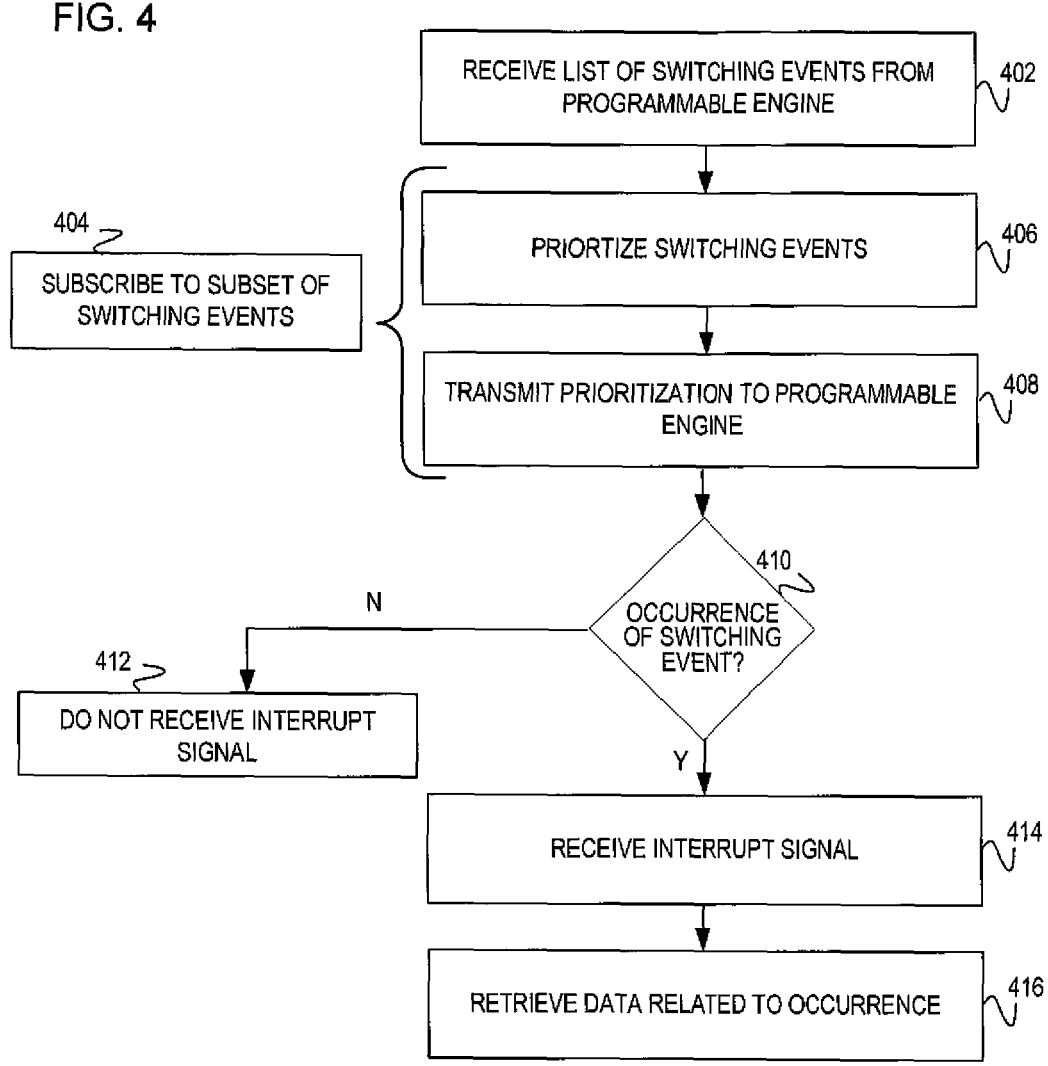
FIG. 4 is a flowchart of an example method executable by a networking device to subscribe to a subset of switching events based on a prioritization of switching events and upon an occurrence of a switching event from the subset of switching events, receive an interrupt signal to retrieve data related to the occurrence.

FIG. 4 is a flowchart of an example method executable by a processor to subscribe to a subset of switching events based on a prioritization. Based on the subscription to the subset of switching events, the processor may receive an interrupt signal from a programmable engine based on an occurrence to one of the switching events from the subset. Upon receiving the interrupt signal, the processor may retrieve data from the programmable engine related to the occurrence. In discussing FIG. 4, references may be made to the components in FIGS. 1-2B to provide contextual examples. For example, the processor 104 and the programmable engine 106 as in FIG. 1 may communicate for transmission of a request and to receive the list of switching events. As the processor and the programmable engine are internal components to the networking device, in this implementation, the networking device executes operations 402-416 to subscribe to the subset of switching events. Although FIG. 4 is described as implemented by the processor and/or networking device, it may be executable on other suitable components. For example, FIG. 4 may be implemented in the form of executable instructions on a machine-readable storage medium 504 and 604 as in FIGS. 5-6.

At operation 402, the processor receives the list of switching events from the programmable engine. The processor transmits a request to the programmable engine for a list of switching events capable of detection by the programmable engine. In turn the programmable engine may track which hardware components are accessible from the programmable engine. Thus, the programmable engine may monitor and identify various occurrences of switching events internal to the networking device. Operation 402 may be similar in functionality to operation 302 as in FIG. 3.

At operation 404, upon receiving the list of switching events, the processor selects the subset of those switching events in which to subscribe. The subset is considered fewer events than the full list of switching events to reduce the amount of event information processed at the processor. In one implementation, the processor subscribes to the subset of switching events through prioritization of the switching events from the list and transmits the prioritization to the programmable engine. The programmable engine in turn monitors those switching events in the subscription and reports event information to the processor. Operation 404 may be similar in functionality to operation 304 as in FIG. 3.

At operation 406, the processor prioritizes the switching events from the list received at operation 402. The processor chooses those switching events in which to subscribe. The priorities may be assigned according to a network, administrator, or networking protocol that specifies which switching events should be rated in higher importance or priority. For example, a counter overflow event may be of less importance than the switching event which may correspond to security violation. Each of the switching events may be assigned a priority value or weighting mechanism value indicating the importance of the switching event in the selection of the subset. Those switching events which are assigned a value above a particular threshold may be selected as the subset. The selected subset are those switching events that the processor directs the programmable engine to monitor. In another implementation, each of the switching events is categorized according to the type of switching event. For example, the switching events from the list may include security violations and hardware bit changes. As such, each of the switching events related to these groups are categorized. Thus, the processor may choose one of the categories of switching events for the programmable engine to monitor.

At operation 408, the processor transmits the prioritization to the programmable engine. Upon the selection of the subset of switching events from the list, the processor transmits the selection of the subset to the programmable engine. Transmitting the subscription to the subset of switching events, the programmable engine monitors those events for the occurrence at operation 410.

At operation 410, the programmable engine monitors for the occurrence to at least one of the switching events from the subset. Upon the occurrence to one of the switching events from the subset, the programmable engine proceeds to transmit an interrupt signal to the processor. In this implementation, the processor receives the interrupt signal at operation 414 which serves as the notification occurrence of such an event. Upon the non-occurrence of the switching events from the subset, the programmable engine may proceed to operation 412 and does not transmit the interrupt signal to the processor. The programmable engine may continue monitoring for the occurrence of one of the switching events from the subset.

At operation 412, based on the non-occurrence of the switching events from the subset, the processor does not receive the interrupt signal. The non-occurrence of the switching events from the subset indicates the programmable engine did not detect the occurrence to one of the switching events to the subscription. In one implementation, the programmable engine continues to monitor for those events in the subset.

At operation 414, the processor receives the interrupt signal from the programmable engine. The interrupt signal signifies to the processor the occurrence to one of the switching events from the subset. The signal indicates to the processor to retrieve the switching event data from the storage area in the programmable engine.

At operation 416, the processor retrieves the switching event data related to the occurrence from the programmable engine. Upon receiving the interrupt signal at operation 414, the processor retrieves the switching event data from storage, such as a buffer in the programmable engine. The event data may include details over the event, such as the time stamp, the location of the event, etc.

Figure 5:
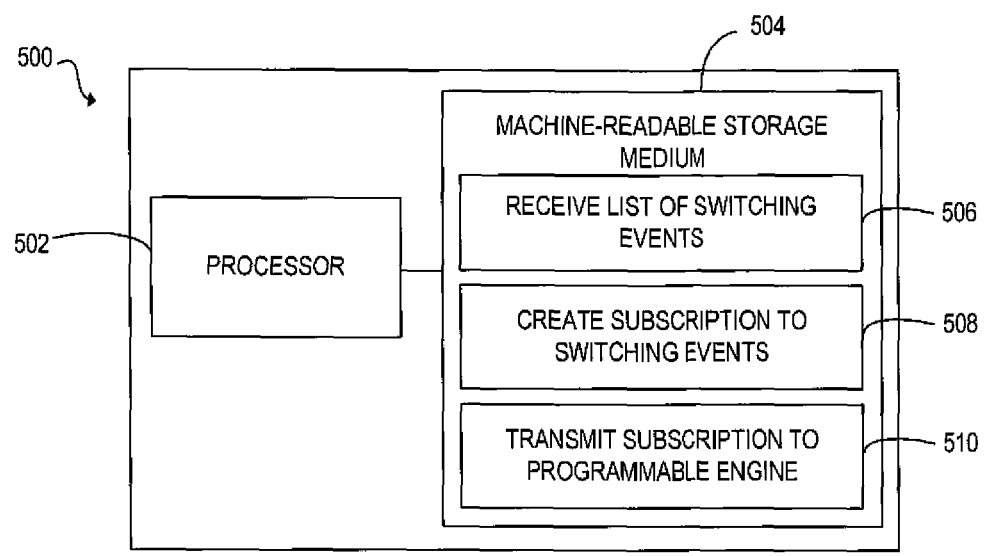
FIG. 5 is a block diagram of an example computing device with a processing resource to execute instructions in a machine-readable storage medium for a transmission of a subscription to a subset of switching events.

FIG. 5 is a block diagram of computing device 500 with a processing resource 502 to execute instructions 506-510 within a machine-readable storage medium 504. Specifically, the computing device 500 with the processing resource 502 is to create a subscription to a subset of switching events from a list of switching events from a programmable engine. Upon the creation of the subscription, the processing resource 502 may proceed to transmit the subscription to the programmable engine. Although the computing device 500 includes processing resource 502 and machine-readable storage medium 504, it may also include other components that would be suitable to one skilled in the art. For example, the computing device 500 may include a programmable engine 106 as in FIG. 1. In other examples, the computing device 500 may include a controller, memory storage, or other suitable type of component. The computing device 500 is an electronic device with the processing resource 502 capable of executing instructions 506-510 and as such embodiments of the computing device 500 include a networking device, networking switch, switch, router, computing device, server, or other type of networking component capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 to transmit the subscription to the subset of switching events. Specifically, the processing resource 502 executes instructions 506-510 to: upon transmitting a request to the programmable engine, receive the list of switching events capable of detection by the programmable engine; create a subscription to the subset of switching events based on a selection from the received list of switching events; and transmit the subscription include the selection of the subset of switching events to the programmable engine.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processing resource 502 to fetch, decode, and/or execute instructions of the machine-readable storage medium 504. The application and/or firmware may be stored on the machine-readable storage medium 504 and/or stored on another location of the computing device 500.

Figure 6:
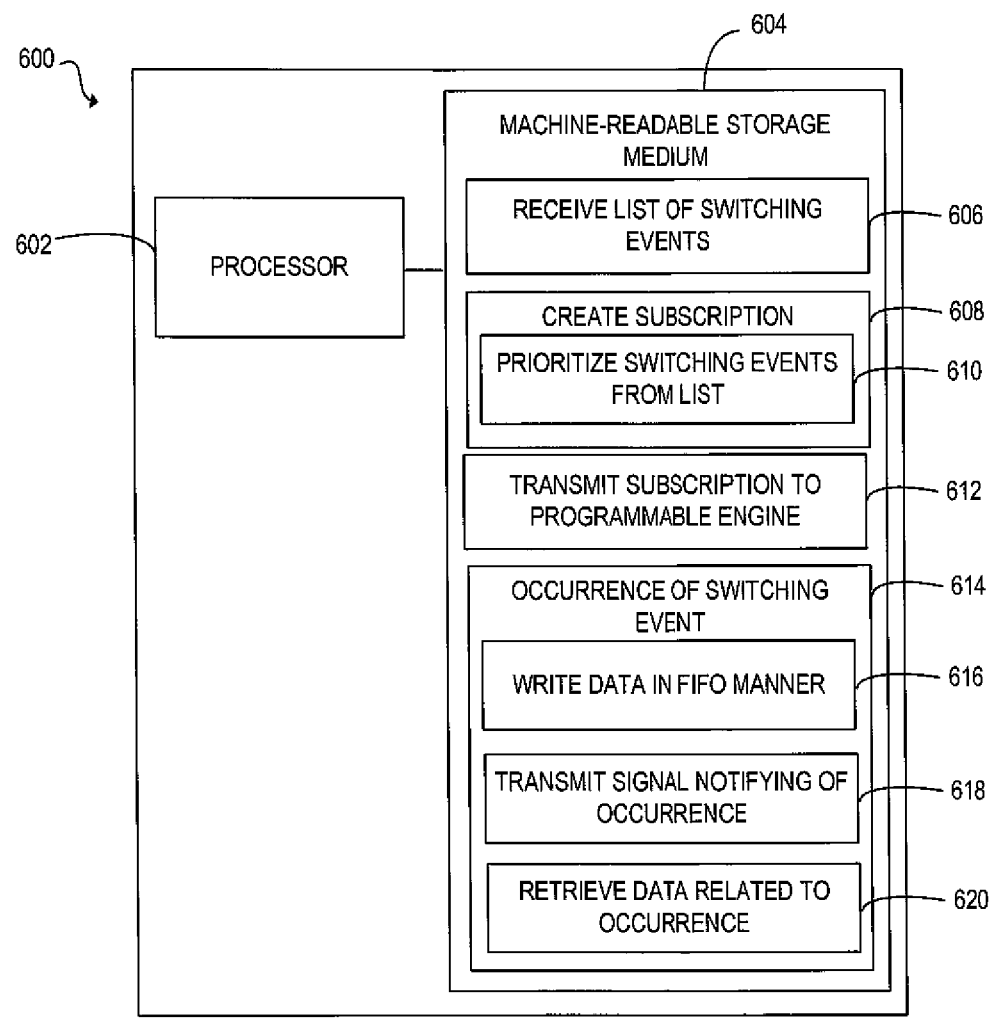
FIG. 6 is a block diagram of an example computing device with a processing resource to execute instructions in a machine-readable storage medium for retrieving data related to an occurrence from a subset of switching events.

FIG. 6 is a block diagram of computing device 600 with a processing resource 602 to execute instructions 606-620 within a machine-readable storage medium 604. Specifically, the computing device 600 with the processing resource 602 is to transmit a subscription to a subset of switching events selected from a list. Upon an occurrence of one of the switching events from the subset, the processor resource 602 is to receive an interrupt signal notifying the occurrence. Upon notification of the occurrence, the processing resource 602 is to retrieve data related to the occurrence from the programmable engine. Although the computing device 600 includes processing resource 602 and machine-readable storage medium 604, it may also include other components that would be suitable to one skilled in the art. For example, the computing device 600 may include a programmable engine 106 as in FIG. 1. In other examples, the computing device 600 may include a controller, memory storage, or other suitable type of component. The computing device 600 is an electronic device with the processing resource 602 capable of executing instructions 606-620 and as such embodiments of the computing device 500 include a networking device, networking switch, switch, router, computing device, server, or other type of networking component capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 to retrieve data related to the occurrence of one of the switching events from the subset. Specifically, the processing resource 602 executes instructions 606-620 to: receive the list of switching events from the programmable engine; create the subscription to the subset of switching events by prioritizing each of the switching events from the list, the switching events prioritized above a threshold are considered the subset; transmit the subscription to the programmable engine; upon an occurrence of one of the switching events from the subset, data related to the occurrence is written into storage in a first-in-first-out (FIFO) manner; receive a notification of the occurrence through a signal; and retrieve the data related to the occurrence from the programmable engine.

The machine-readable storage medium 604 includes instructions 606-620 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processing resource 602 to fetch, decode, and/or execute instructions of the machine-readable storage medium 604. The application and/or firmware may be stored on the machine-readable storage medium 604 and/or stored on another location of the computing device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by processor, the method comprising:
  receiving a list of events which are unexpected conditions internal to a networking switch and detectable by a programmable engine;
  subscribing to a subset of events by selecting the subset of events from the list of events based on an assigned priority, a weighting mechanism, and a predetermined threshold;
  in response to the programmable engine detecting an occurrence of a first event of the subscribed subset of events, receiving an interrupt signal which indicates the occurrence of the first event and notifies the processor to retrieve data related to the occurrence; and
  retrieving the data associated with the occurrence.

2. The method of claim 1, wherein subscribing to the subset of events comprises:
  prioritizing each of the events within the subset; and
  transmitting the prioritization to the programmable engine.

3. The method of claim 1, wherein subscribing to the subset of events by selecting the subset of events from the list of events comprises:
  creating a subscription to the subset of switching events; and
  transmitting the created subscription of events to the programmable engine.

4. The method of claim 1,
  wherein the priority and the weighting mechanism are an assigned value indicating an importance of an event in the list of events; and
  wherein events with an assigned value greater than the predetermined threshold are selected as the subset of events.

5. The method of claim 1, wherein subscribing to the subset of events comprises:
  assigning the weighting mechanism to each of the events in the list of events to identify the subset of the events.

6. The method of claim 1, wherein receiving the list of events detectable by the programmable engine comprises:
  receiving a list of resources accessible to the programmable engine.

7. A networking switch, comprising:
  a programmable engine to:
    in response to a request from a processor, transmit a list of events which are unexpected conditions internal to the networking switch and detectable by the programmable engine;
    receive a subscription from a processor to a subset of events; and
    in response to detecting an occurrence of a first event of the subscribed subset of events, transmit to the processor an interrupt signal which indicates the occurrence of the first event and notifies the processor to retrieve data related to the occurrence; and
  the processor to:
    receive the list of events from the programmable engine; and subscribe to the subset of events by selecting the subset of events from the list of events based on an assigned priority, a weighting mechanism, and a predetermined threshold.

8. The network switch of claim 7, wherein to subscribe to the subset of events, the processor is to:
   prioritize the events in the list of events; and
   transmit the prioritization of the events to the programmable engine.

9. The network switch of claim 7, further comprising:
   a storage, coupled to the programmable engine, to store data associated with the occurrence of the first event of the subscribed subset of events.

10. The network switch of claim 9, wherein the processor is further to:
    receive from the programmable engine the interrupt signal; and
    retrieve the stored data associated with the occurrence.

11. A non-transitory machine-readable storage medium comprising instructions that when executed by a processing resource cause a networking device to:
    receive a list of events which are unexpected conditions internal to the networking device and detectable by a programmable engine;
    create a subscription to a subset of events by selecting the subset of events from the list of events based on an assigned priority, a weighting mechanism, and a predetermined threshold;
    transmit the subscription to the programmable engine;
    in response to the programmable engine detecting an occurrence of a first event of the subscribed subset of events, receive an interrupt signal which indicates the occurrence of the first event and notifies the processor to retrieve data related to the occurrence; and
    retrieve the data associated with the occurrence.

12. The non-transitory machine-readable storage medium of claim 11, wherein the subset of the events is a group of a single type of switching events.

13. The non-transitory machine-readable storage medium of claim 11, wherein to create the subscription to the subset of events comprises instructions that when executed by the processing resource cause the networking device to:
    prioritize the events from the list of events to create the subscription to the subset of events.

14. The non-transitory machine-readable storage medium of claim 11,
    wherein the priority and the weighting mechanism are an assigned value indicating an importance of an event in the list of events; and
    wherein events with an assigned value greater than the predetermined threshold are selected as the subset of events.

15. The non-transitory machine-readable storage medium of claim 14, comprising instructions that when executed by the processing resources cause the networking device to:
    in response to the occurrence of the first event of the subscribed subset of events, write the data associated with the occurrence into a storage area in a first-in-first-out manner.

* * * * *